United States Patent [19]

Beard et al.

[11] Patent Number: 4,634,528
[45] Date of Patent: Jan. 6, 1987

[54] FILTER FOR INTRA-CHANNEL CLARIFICATION

[76] Inventors: Harold J. Beard; Raleigh L. Cox, both of P.O. Box 3838, Baton Rouge, La. 70821

[21] Appl. No.: 784,154

[22] Filed: Oct. 4, 1985

[51] Int. Cl.$^4$ .................. B01D 23/24; B01D 29/38; B01D 33/16
[52] U.S. Cl. .................. 210/277; 210/279
[58] Field of Search .................. 210/195.4, 197, 521, 210/525, 532.1, 624, 629, 279, 277, 170, 278, 926, 294, 295, 296, 299, 302, 305, 307, 311

[56] References Cited

U.S. PATENT DOCUMENTS 1,398,285 11/1921 Tanner .................. 210/302
4,032,443 6/1977 Ross .................. 210/279

Primary Examiner—Frank Sever
Attorney, Agent, or Firm—Robert C. Tucker; William D. Kiesel; J. B. Overton

[57] ABSTRACT

A filter for use in conjunction with an intrachannel clarifier is provided comprising an enclosure, positionable within a channel and connectible to an intrachannel clarifier, and having a floor and sides; a filter compartment fixed within the enclosure, and having sides, either connected to or coincidental with the sides of the enclosure and segregating the interior of the filter compartment from the remainder of the enclosure; a porous medium support, fixedly connected to the sides of the enclosure and positioned within the filter compartment; a bottom, below the medium support and fixedly connected to the sides of the filter compartment; a filter medium, positioned within the filter compartment above the medium support; a conduit, connecting between the interior of the filter compartment beneath the medium support and the interior of the enclosure; a liquid dispersion mechanism, positioned within the filter compartment above the filter medium, for receiving liquid from outside the enclosure and dispersing the liquid over the filter medium; and a liquid transfer mechanism, connected to the interior of the enclosure, for transferring liquid out of the enclosure.

13 Claims, 3 Drawing Figures

FILTER FOR INTRA-CHANNEL CLARIFICATION

BACKGROUND OF THE INVENTION

1. Field of the Invention

This invention relates generally to filters, and, more particularly, to filters which are utilized to clarify water in sewage treatment or other liquid waste treatment processes.

2. Prior Art

In the treatment of liquid wastes. such as sewage, many processes are utilized to accomplish various stages of clarification of the wastes. One group of processes uses an oxidation ditch or other such channel to circulate waste liquids for aeration prior to further treatment. Various devices have been designed to clarify the aerated wastes inside the oxidation ditch or channel. Such devices have been referred to as intra-channel clarifiers, among other terms. Examples of systems utilizing intra-channel clarification can be found in U.S. Pat. Nos. 4,303,516, 4,362,625, 4,383,922 and 4,457,844. Once the waste is processed by the intra-channel clarifier, it is normally transferred by gravity flow or other means to a point outside of the channel for removal or further treatment, such as filtration. Additional treatment outside the channel requires additional energy consumption and land use as well as separate facilitites from those in the channel.

SUMMARY OF THE INVENTION

Therefore, it is an object of this invention to provide an improved filter for use in conjunction with an intra-channel clarifier, and which may be installed within an oxidation ditch or channel.

It is another object of this invention to provide such a filter which will minimize additional energy consumption in the treatment process.

Accordingly, a filter for use in conjunction with an intra-channel clarifier is provided comprising an enclosure, positionable within a channel and connectible to an intrachannel clarifier, and having a floor and sides; a filter compartment fixed within the enclosure, and having sides, either connected to or coincidental with the sides of the enclosure and segregating the interior of the filter compartment from the remainder of the enclosure; a porous medium support, fixedly connected to the sides of the enclosure and positioned within the filter compartment; a bottom, below the medium support and fixedly connected to the sides of the filter compartment; a filter medium, positioned within the filter compartment above the medium support; a conduit, connecting between the interior of the filter compartment beneath the medium support and the interior of the enclosure; a liquid dispersion mechanism, positioned within the filter compartment above the filter medium, for receiving liquid from outside the enclosure and dispersing the liquid over the filter medium; and a liquid transfer mechanism, connected to the interior of the enclosure, for transferring liquid out of the enclosure.

DESCRIPTION OF PREFERRED EMBODIMENTS OF THE INVENTION

Figure 1:
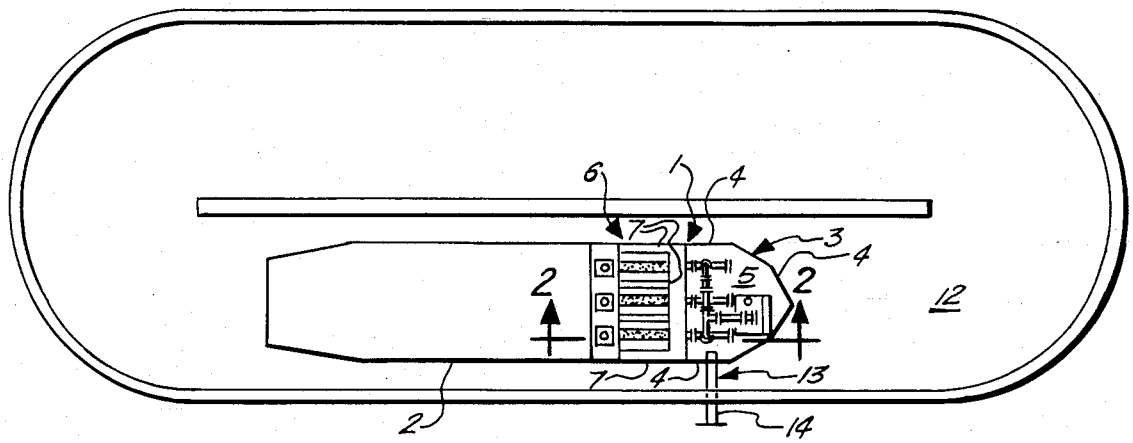
FIG. 1 is an overhead view of a preferred embodiment of the invention.
Figure 2:
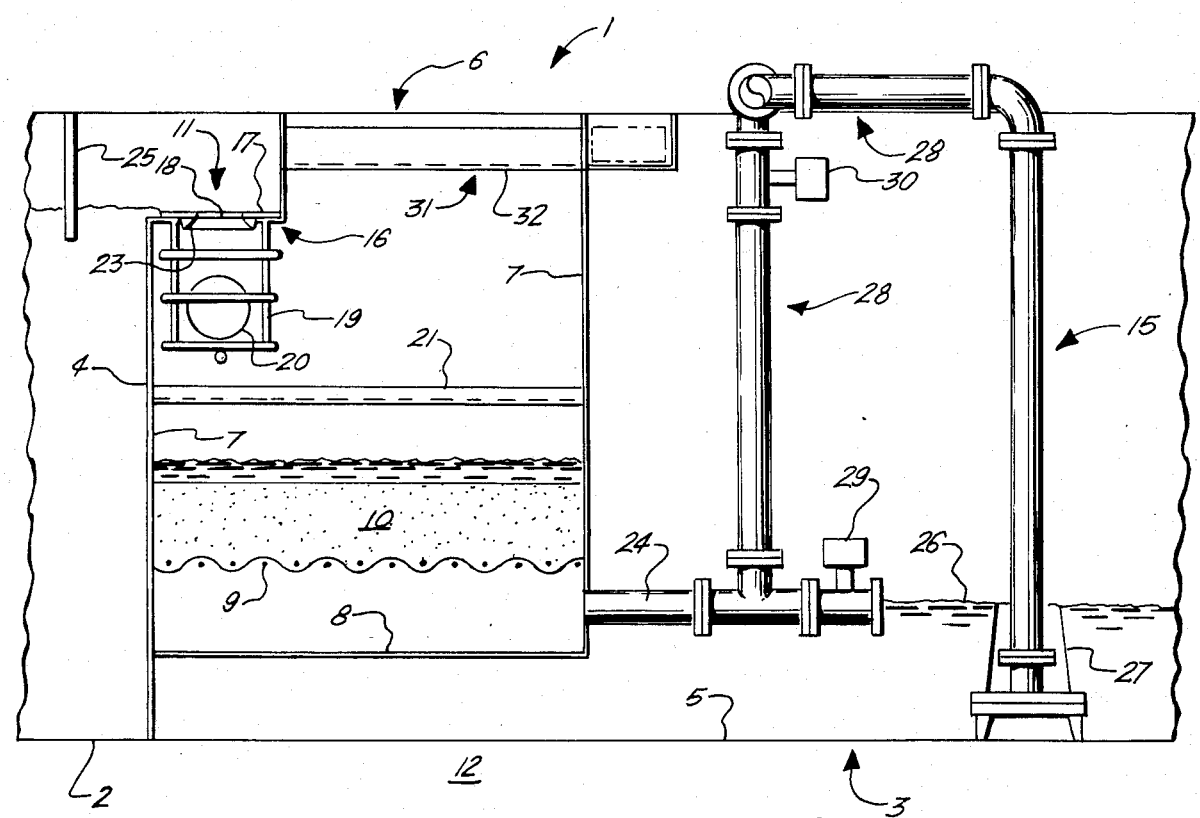
FIG. 2 is a sectional view taken along line 2—2 of FIG. 1.
Figure 3:
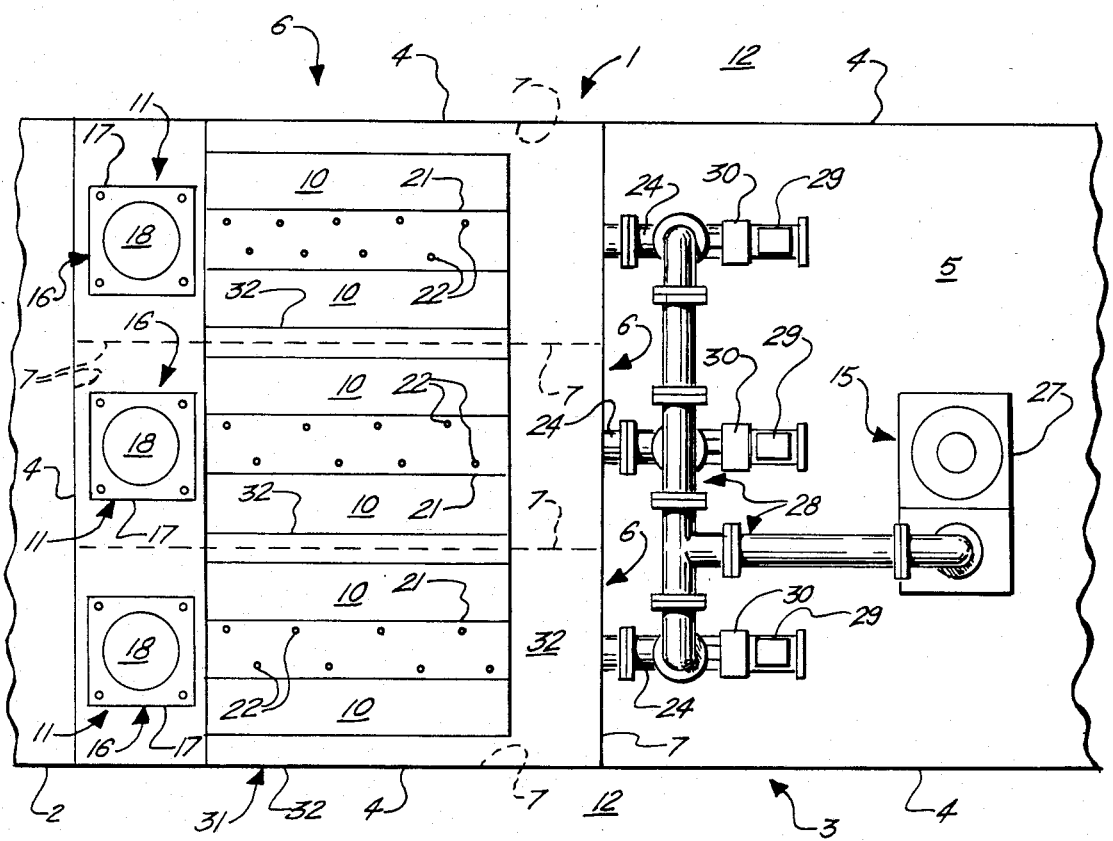
FIG. 3 is an enlarged top view of the preferred embodiment shown in FIG. 1.

As shown in the figures, the filter 1 is either integrally formed with or connectible to an intra-channel clarifier 2. The filter 1 generally comprises an enclosure 3 having sides 4 and 5. Although a rectangular shape is shown in the figures, other shapes are acceptable, such as an oval shape having continuous sides 4. A filter compartment 6 is located inside enclosure 3, and has sides 7 and bottom 8. Three such compartments 6 are shown in the figures, although any suitable number may be used to attain the necessary result and redundancy. Sides 7 may be coincidental with some enclosure sides 4 as shown. A porous medium support 9, usually a scrren, is provided above bottom 8, supporting a filter medium 10, usually sand. A liqid despersion means 11 is provided to receive clarified waste liquid from clarifier 2 and disperse the liquid over the filter medium 10. Enclosure 3 receives filtered liquid from the filter compartment 6 through conduit 24 and transfers it out of the channel 12 via liquid transfer means 13, usually a pipe 14. It is preferable that enclosure 3 be large enough to store enough filtered liquid to occasionally backwash he filter medium 10 using backwash means 15, usually a pump 27.

It is preferable that liquid dispersion means 11 comprise a check valve 16 to prevent liquid from re-entering clarifier 2 during backwash operations. More preferably, check valve 16 should comprise a horizontal plate 17 connected to one side 7 and having an opening 18 therein. A basket 19 is suspended below plate 17 and contains a floatable ball 20. Ball 20 is of a larger diameter than opening 18, such that ball 20 will seal opening 18 when liquid rises during backwash operations. It is preferable that a seat 23 be provided in opening 18 to allow for firm seating of ball 20. In order to provide for even distribution of liquid over filter medium 10, a distribution trough 21 having openings 22 is provided below each check valve 16.

Operation of the filter 1 is simple, energy efficient, and effective. Check valve 16 receives liquid (usually clarified sewage) from clarifier 2, usually after the liquid has flowed around a series of baffles 25. The liquid then flows through check valve 16 and onto distribution trough 21, where it drips onto the passes through filter medium 10. Filtered liquid is collected in the bottom 8 of filter compartment 6 and flows through conduit 24 into enclosure 3. When the liquid level 26 reaches a desired height, pipe 14 provides a means of exit from the channel 12. Preferably, liquid level 26 is high enough to permit storage of enough filtered liquid for backwashing operations.

Backwashing is accomplished using backwash means 15. Pump 27 pumps liquid from enclosure 3 through manifold piping 28 and into conduit 24. Of course, pump 27 and its source for backwash liquid could be located remotely with respect to the filter 1. However, in order to minimize energy use and space requirements, the arrangement shown will ofter prove to be the best. During backwash operations, first valve 29 is closed and second valve 30 is opened. Preferably, first and second valves 29, 30 are remotely operable valves, such as solenoid or air operated valves. As liquid is pumped back through conduit 24, the filter compartment 6 begins to fill, with the backflow eventually causing filtered matter captured by the filter medium 10 to flow toward the top of compartment 6. As the compartment 6 fills, ball 20 will seal opening 18. A backwash removal means 31 removes backwash liquid from the enclosure 3. While removal means 31 may be a pump (not shown), it is preferred that a backwash trough 32 be provided, communicating between the interior of the compartment 6 and the exterior of the enclosure 3, usually transmitting backwashed liquid back into the channel 12 for further aeration or other treatment.

Thus, the filter 1 provides a means in the channel 12 for additionally filtering the discharge from an intra-channel clarifier 2. The filter 1 may utilize gravity flow for all filtering operations, requiring pumping only for backwash operations. Land usage is not perceptibly increased, since the filter 1 is contained in the channel 12. The design utilizes a minimum of moving parts. Of course, other embodiments of the invention will occur to those skilled in the art to which it pertains, and such embodiments are intended to be within the scope and spirit of the following claims.

I claim:

1. A filter, comprising a means designed for reducing energy consumption and land use in conjunction with sewage treatment systems utilizing intra-channel clarification, including:
   a. an enclosure, positionable within a channel and connectable to an intra-channel clarifier, and having a floor and sides;
   b. a filter compartment fixed within said enclosure, having:
      i. sides, either connected to or coincidental with said sides of said enclosure and segregating the interior of said filter compartment from the remainder of said enclosure;
      ii. a porous medium support, fixedly connected to said sides of said enclosure and positioned within said filter compartment;
      iii. a bottom, below said medium support and fixedly connected to said sides of said filter compartment;
      iv. a filter medium, positioned within said filter compartment above said medium support;
      v. a conduit, connecting between the interior of said filter compartment beneath said medium support and the interior of said enclosure;
   c. a liquid dispersion means, positioned within said filter compartment above said filter medium, for receiving liquid from said intra-channel clarifier and dispensing said liquid over said filter medium; and
   d. a liquid transfer means, connected to the interior of said enclosure, for transferring liquid out of said enclosure.

2. A filter according to claim 1, further comprising:
   e. a backwash means, connected to said conduit, for filling said filter compartment withe liquid; and
   f. a backwash removal means, connected to the interior of said filter compartment above said filter media, for transferring backwashed liquid exterior to said enclosure.

3. A filter according to claim 2 wherein said backwash removal means comprises at least one backwash trough, positioned in said filter compartment above said filter medium and communicating between the interior of said filter compartment and the exterior of said enclosure.

4. A filter according to claim 2 wherein said backwash means comprises a pump, positioned in said enclosure and having a suction line opening near said floor and discharge line connected to said conduit.

5. A filter according to claim 2, wherein said dispersion means comprises check valve which only allows liquid to flow into said filter compartment through said check valve.

6. A filter according to claim 5, wherein said check comprises:
   i. a plate, fixedly connected to and extending horizontally inward from one said side of said filter compartment and having an opening therein;
   ii. a basket surrounding, encasing and suspended below said opening; and
   iii. a floatable ball having a diameter greater than that of said opening, encased within said basket.

7. A filter according to claim 6, wherein said backwash removal means comprises at least one backwash trough, positioned in said filter compartment above said filter medium and communicating between the interior of said filter compartment and the exterior of said enclosure.

8. A filter according to claim 7, wherein backwash means comprises a pump, positioned in said enclosure and having a suction line opening near said floor and a discharge line connected to said conduit.

9. A filter according to claim 8, wherein said liquid transfer means comprises a second conduit opening between the interior of said enclosure and a desired point of transfer for filtered liquids.

10. A filter according to claim 1, wherein said dispersion means comprises check valve which only allows liquid to flow into said filter compartment through said check valve.

11. A filter according to claim 10, wherein said check valve comprises;
    i. a plate, fixedly connected to and extending horizontally inward from one said side of said filter compartment and having an opening therein;
    ii. a basket surrounding, encasing and suspended below said opening; and
    iii. a floatable ball having a diameter greater than that of said opening, encased within said basket.

12. A filter according to claim 1, further comprising at least one distribution trough, suspended in said filter compartment below said liquid dispersion means and above said filter medium, said trough having a plurality of openings therein.

13. A filter according to claim 1, wherein said liquid transfer means comprises a second conduit opening between the interior of said enclosure and a desired point of transfer for filtered liquids.

* * * * *